United States Patent [19]

Green et al.

[11] 4,413,217

[45] Nov. 1, 1983

[54] POWER FACTOR CONTROLLER

[75] Inventors: Dan Green, Cranford, N.J.; Sandor Goldner, Brooklyn, N.Y.

[73] Assignee: Cynex Manufacturing Corporation, Hillside, N.J.

[21] Appl. No.: 231,611

[22] Filed: Feb. 5, 1981

Related U.S. Application Data

[63] Continuation-in-part of Ser. No. 166,046, Jul. 7, 1980.

[51] Int. Cl.$^3$ .............................................. H02P 5/40
[52] U.S. Cl. .................................... 318/729; 318/812
[58] Field of Search ............................... 318/729, 812

[56]          References Cited
       U.S. PATENT DOCUMENTS

| B 458,010 | 3/1976 | Sem-Sandberg | 324/830 |
|---|---|---|---|
| 3,663,956 | 5/1972 | Purdy et al. | 324/830 |
| 4,099,109 | 6/1978 | Abbondanti | 318/810 |
| 4,249,120 | 2/1981 | Earle | 318/729 |
| 4,266,177 | 5/1981 | Nola | 318/810 |

OTHER PUBLICATIONS

"Improved Power-Factor Controller", NASA Tech. Briefs, Summer 1980, G. C. Marshall Space Flight Center, Ala. 35812.

*Primary Examiner*—David Smith, Jr.
*Attorney, Agent, or Firm*—Goodman & Teitelbaum

[57]           ABSTRACT

A power factor controller for AC induction motors having a control triac connected in series with the motor for controlling the voltage applied across the motor to reduce the power to the motor commensurate to motor loading. A sensing circuit produces square wave pulses representative of the phase difference between the current through the motor and line voltage across the motor. A reference circuit provides a reference signal representative of the full cycle of the pulse. A comparison circuit compares the output of the sensing circuit with the reference circuit and produces the phase lag signal for the control circuit. In a digital embodiment the sensing means and reference means each respectively control gated clocks whereby the count is representative of the duration of the pulse. In an analog version there is included an integration circuit which produces an output voltage level proportional to motor loading. A regenerative feedback circuit is coupled across the integration circuit and responds to turn on of the motor as well as application of sudden loads to the motor to provide full voltage to the motor.

3 Claims, 24 Drawing Figures

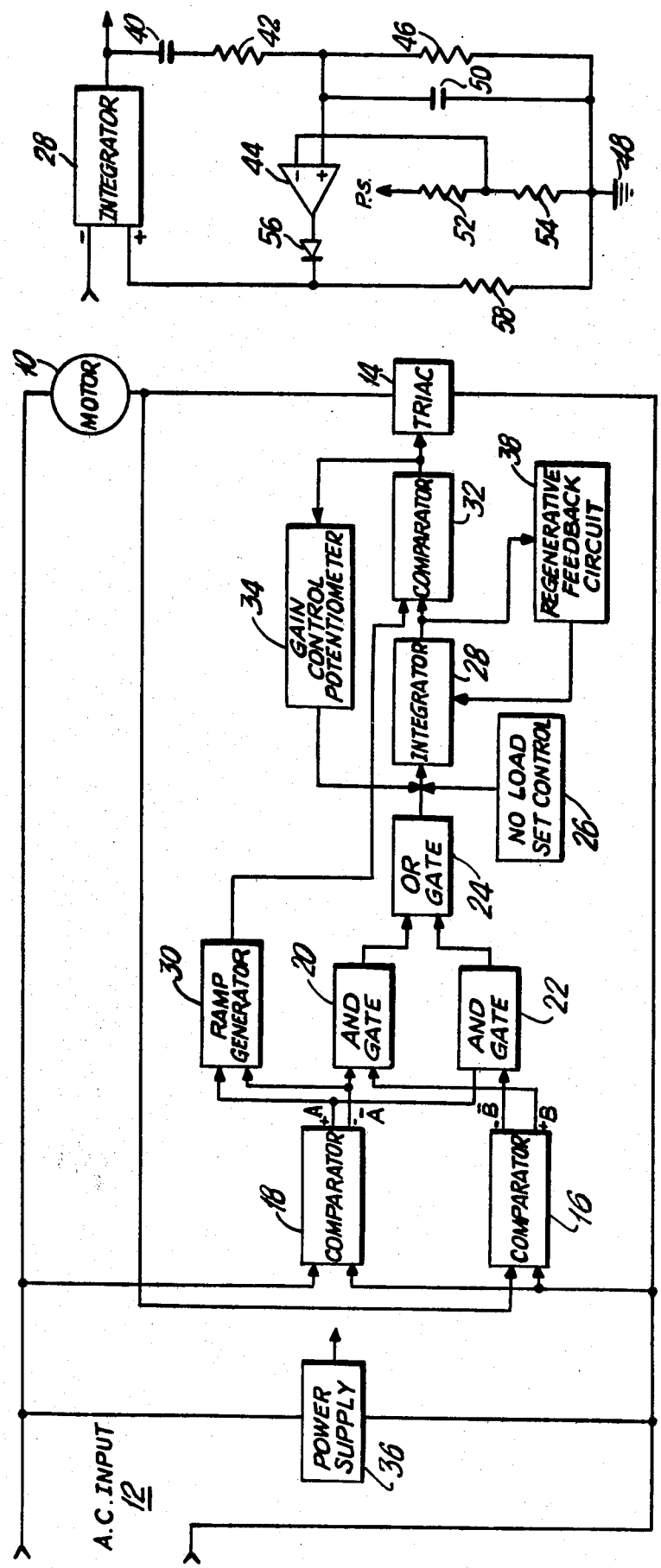

POWER FACTOR CONTROLLER

RELATION TO OTHER APPLICATIONS

This application is a continuation-in-part application of Ser. No. 166,046 filed on July 7, 1980 by the present inventors for "Power Factor Controller" the entire application being incorporated herein by reference.

BACKGROUND OF THE INVENTION

This invention relates to systems which automatically control the power input to a motor making it commensurate with loading on the motor to thereby increase the efficiency of the motor.

In the aforementioned parent application there was described a power factor controller for an AC induction motor. The system described samples line voltage and current through the motor and decreases power input to the motor proportional to the detected phase displacement between the current and voltage to thereby provide less power to the motor as it is less loaded.

In one embodiment described there is an analog power factor circuit which includes a start up circuit which responds to the initial energization of the motor for maintaining the "ON" time of a triac in series with the motor at maximum in order to enable the motor to reach full speed in minimum time. The specific circuit described for achieving that purpose included a one-shot which responds to the initial energization of a power supply in order to provide a voltage which insures full turn on for an initial energization.

While such circuit is effective during initial turn on, it would be beneficial if the same circuit which provides full voltage to the motor during turn on would also be available for use when sudden loads are applied to the motor during normal operation. In such situations, the controller should also apply full voltage to the motor for a short time to prevent stalling.

In another embodiment in the aforementioned copending application, there is described a digital power factor circuit. Such circuit, however, is not completely digital in that the reference saw tooth waveform is provided by an analog ramp generator. Additionally, the circuit which provided the initial offset for full load lag provided a fixed offset. However, it is known that such full load phase lag varies for each motor and accordingly should be set on the controller in accordance with the specific motor being utilized. Additionally, the number of output pulses provided to the triac was an integral number of the cycles of input voltage. It would be beneficial if the number of pulses could be controlled so as to be sent either once or twice per cycle. This would provided improved response time and greater accuracy which would produce more efficiency.

Accordingly, although the aforementioned copending application provides numerous novel features, the present invention provides additional improvements over such power factor controller circuits which are described.

SUMMARY OF THE INVENTION

Accordingly, it is an object of the present invention to provide a power factor controller which improves on the aforementioned power factor controller of the copending application.

Another object of the present invention is to provide an analog power factor controller with a circuit which applies full voltage to the motor both during initial turn on as well as when sudden loads are applied to the motor during normal operation.

Still another object of the present invention is to provide an analog power factor controller which utilizes regenerative feedback connected to the integrator circuit in order to detect initial turn on as well as to detect sudden loads being applied to the motor.

A further object of the present invention is to provide a digital power factor controller which can provide control pulses to the triac in series with the motor once or twice per cycle, in accordance with embodiments of the present invention.

A further object of the present invention is to provide a digital power factor controller which includes circuitry for setting the full load phase lag of the particular motor as an offset to the phase lag detected during each cycle.

Still a further object of the present invention is to provide a digital power factor controller which provides a digital embodiment of a ramp generator for generating a reference saw tooth waveform.

A further object of the present invention is to provide a power factor controller which is adjustment free, easier to manufacture, more reliable, provides faster response, and utilizes simplified circuitry than prior described controllers.

Briefly, in accordance with an embodiment of the present invention, there is provided a digital power factor controller for an AC induction motor. The controller includes a control circuit which is adapted to be electrically connected in series with the motor for controlling the voltage applied across the motor. A sensing circuit provides gated clock signals whose count varies in accordance with the difference in phase between the current through the motor and the line voltage across the motor. A reference circuit provides reference clock signals whose count represents the full cycle of line voltage. This count is reset for each zero crossing of the line voltage. A comparison circuit compares the output of the sensing circuit with the output of the reference circuit and produces a phase lag control signal. This control signal is applied to the control circuit for controlling the conduction angle of the voltage applied to the motor to thereby provide power to the motor commensurate with motor loading.

In an embodiment of the invention, a variable trigger circuit is provided which provides an output whose duration can be calibrated to equal the full load phase angle of the particular motor being utilized. This output is then utilized to offset the output phase angle provided in each cycle.

In an embodiment of the invention, the circuit provides phase lag output pulses responsive to positive line voltage half cycles and positive current half cycles, as well as for negative line voltage half cycles and negative current half cycles. In this manner, the phase lag pulses are produced at twice per line cycle.

In another embodiment of the present invention there is provided a power factor controller for an AC induction motor which includes a control circuit adapted to be electrically connected in series with the motor for controlling the voltage applied to the motor from the line voltage. A sensing circuit produces square wave pulses representative of the phase difference between the current through the motor and the line voltage across the motor. An integration circuit receives the square wave pulses and produces an output voltage level proportional to the motor loading. A reference circuit provides a saw tooth wave synchronized with the line voltage. A comparison circuit compares the saw tooth wave with the output voltage level to produce phase lag control pulses. These control pulses are applied to the control circuit for controlling the conduction angle of the voltage applied to the motor to thereby provide power to the motor commensurate with motor loading. A regenerative feedback circuit is coupled across the integration circuit and responds to an excessive rate of change at the output of the integration circuit to cause full line voltage to be temporarily applied to the motor.

Such excessive rates of change would occur when the motor is switched onto the circuit of the controller where the power supply and circuit of the system has previously been energized. In this manner the controller applies full voltage to the motor during startup so the motor reaches full speed in minimum time.

At the same time, when sudden loads are applied to the motor during normal operation, the controller applies full voltage to the motor for a short time in order to prevent stalling.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings

FIG. 1 is a block diagram showing an analog power factor controller system in accordance with the present invention;

FIG. 2 is a circuit diagram showing the regenerative feedback circuit described in connection with FIG. 1;

In the various figures of the drawing, like reference characters designate like parts.

DESCRIPTION OF THE PREFERRED EMBODIMENTS

Figure 3:
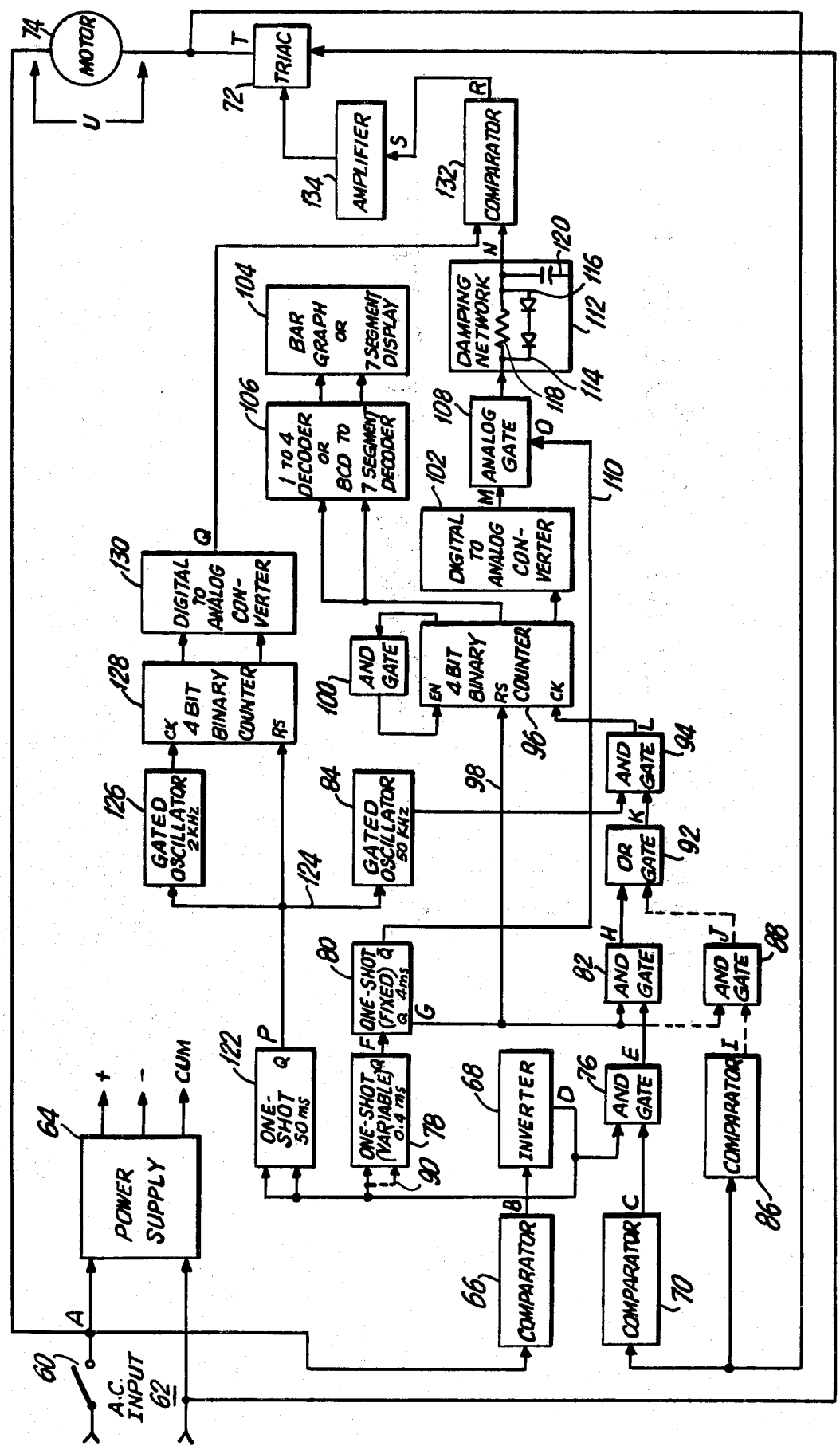
FIG. 3 is a block diagram showing a digital power factor controller system in accordance with the present invention.

Referring now to FIG. 1, there is shown the improved analog power factor control system in accordance with the present invention. An AC induction motor 10 is powered by means of an alternating voltage applied as the AC input 12. The input power passes to the motor under control of a triac 14 connected in series with the motor. The triac is triggered for controlled portions of each half cycle of power input to regulate the amount of power being sent to the motor.

When the motor is initially turned on, comparator 16 begins to sense the presence of line voltage across the triac 14. Comparator 18, connected across the AC input, senses the input line voltage. The output of comparator 16 is two square waves which represent the motor current as well as its inversion. The output of comparator 18, provides two square waves representing the line voltage and its inversion.

The outputs of the two comparators 16, 18, are applied to the inputs of AND gates 20 and 22. It should be noted that the positive and negative outputs of the respective comparators are applied to the same AND gate. At the output of each of the AND gates 20 and 22, there is a low level pulse whose width depends on the phase displacement between voltage and current. The signals from the two gates 20 and 22 are applied to the inputs of OR gate 24 which combines them and provides output pulses having a duty cycle equal to the phase displacement between the voltage across the motor winding and the current through the motor winding. The output from OR gate 24 is combined with a small, variable negative voltage from no load set control 26 which can be a potentiometer providing a voltage level. These two outputs are then sent to the input of the integrator 28.

Integrator 28 provides a negative output voltage which becomes less negative as the load on the motor 10 is increased, and more negative as the load on the motor is reduced. The equilibrium or no-load being set by the control 26 at a value experimentally determined to provide adequate power to the motor to make it run at a constant speed with adequate stability at no-load.

A positive output from the comparator 18 is also sent to a ramp generator 30 which produces a negative polarity saw tooth voltage synchronized with the zero crossing of each half cycle of the line voltage. The output from the ramp generator 30 together with the output from the integrator 28 are sent to the comparator 32. When the negative output voltage from the integrator intersects the saw tooth signal from the ramp generator, comparator 32 provides a negative output pulse which is applied to the triac 14 to turn in "ON" so as to apply power to the motor at that time during each half cycle. The pulses occur from the comparator once per each half cycle.

A portion of the output from comparator 32 is returned through gain control potentiometer 34 back to the input of integrator 28 in order to add a small amount of positive feedback in order to increase the stability and therefore the system. This feedback enables full power to be applied to motors having different full load voltage current phase lags.

Power supply 36 is included and is energized from the AC input 12. The power supply is used to energize the various circuit components of the system.

When the motor is first turned on, regardless of whether the motor is switched together with the power factor controller circuit or not, the motor should immediately start up to full power. Additionally, when sudden loads are applied to the motor during normal operation, the controller should apply full voltage to the motor. This full voltage which is applied both during start up as well as during sudden loads, should only be applied for short periods of time after which the controller should again take over, whereby the amount of power sent to the motor will be commensurate with the loading of the motor.

In order to achieve this goal, a regenerative feedback circuit 38 is connected from the output of the integrator back to its input.

With reference now to FIG. 2, the details of the regenerative feedback circuit will now be described. The rate of change in voltage at the output of the integrator 28 exceeds a predetermined value when the motor is switched on at the output terminals of the controller. This condition is also true when a sudden load is applied to the motor while it is running powered by the controller. Typically, such rate of change which is exceeded is a threshold value of one volt per second.

Normally, the voltage at the output of the integrator is negative. Accordingly, this causes a voltage reduction to the motor at some reduced load. Under normal situations, the output of the integrator would therefore become less negative at the time of start up or sudden load.

The changing voltage at the output of the integrator resulting from the turning on of the motor or the placing of a sudden load on the motor, is applied to a capacitor 40 placed in series with a resistor 42 and passes to the non inverting input of comparator 44.

Capacitor 50 is placed in parallel acorss the non inverting input of comparator 44. The values of the resistor 42 and capacitor 50 are selected so as to make the comparator unresponsive to rates of change exceeding certain values of short duration. Although usually rates of change excessively greater than the threshold value occur from initial start up or from sudden application of the load, it is possible that these large rates of change will also occur during fluctuations or oscillations on the line. However, in that case, they are of generally short duration. The resistor 42 and capacitor 50 accordingly make the comparator unresponsive to rates of change of such short duration. Specifically, they will make the comparator unresponsive to rates of change exceeding one volt per 0.03 seconds.

Resistor 46 provides a leakage path for the capacitors 40 and 50 and is connected in parallel across the capacitor 50. Such leakage occurs while the circuit is inactive.

Resistors 52 and 54 are serially connected between the power supply and ground 48 and have their mid point connected to the inverting input of the comparator 44. These resistors set the switching threshold of the comparator. The typical value of set is 30 mv.

When the rate of change of the integrator output exceeds the lower limit set by the capacitor 40 and resistor 42, the comparator 44 output becomes positive. This forward biases diode 56 coupling the comparator output to the non inverting input of the integrator 28. This in turn causes the integrator output to become less negative. This process is regenerative so that the outputs of comparator 44 and integrator 28 quickly reach their positive output limit.

At this point, full voltage is applied to the motor 10, shown in FIG. 1, due to the action of the comparator 32 which applies continuous gate drive to the triac.

The integrator 28 and comparator 44 have their outputs slowly drift back down to their normal negative operating level where the controller circuit can then resume its normal operation whereby the conduction angle of the triac is reduced in accordance with motor loading and therefore the voltage across the motor is reduced at the reduced loads. The resistor 58 shown in FIG. 2 interconnects the diode to ground during normal periods.

The circuit shown in FIG. 2 will therefore operate both when the motor is switched on and also when sudden loads are applied to the motor during normal operation.

Figure 4:
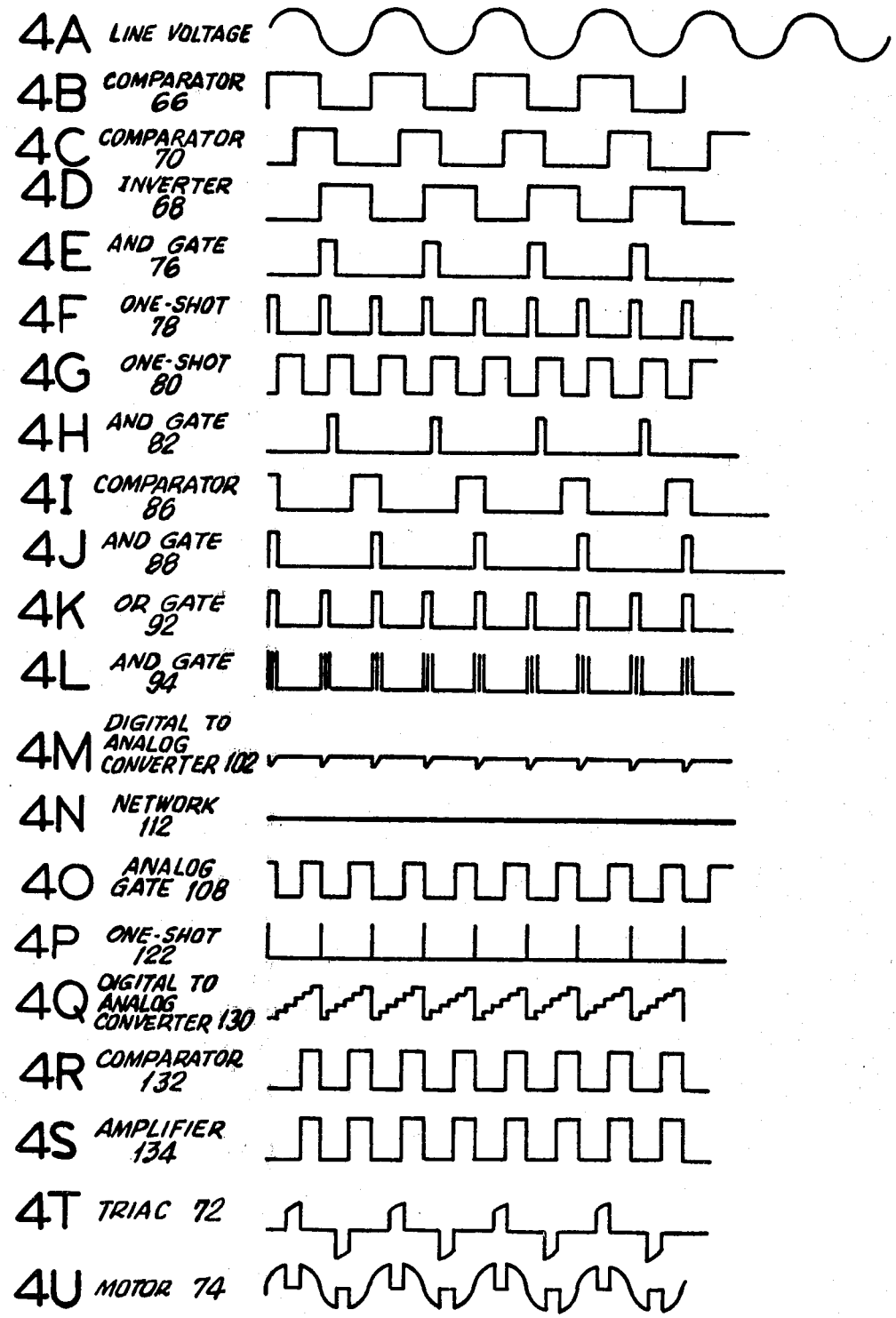
FIGS. 4A-4U are waveforms illustrating aspects of the operation of the circuit shown in FIG. 3.

Referring now to FIGS. 3 and 4, an improved digital power factor controller for AC induction motor will also be now described. When the power switch 60 is closed, AC power from the AC input 62 is applied to the system. Power supply 64 is energized providing the necessary operating voltages to the remaining circuitry.

The power line signal, shown as FIG. 4A, is applied to comparator 66 which converts the sine wave on its input into a square wave output as is shown in FIG. 4B. The output from comparator 66 is sent to inverter 68 which shifts the phase of the output of comparator 66 by 180 degrees producing the output shown in FIG. 4D.

Comparator 70 senses the presence of voltage across the triac 72 which is in series with the motor 74, and converts the voltage into a square wave, shown in FIG. 4C. Since the triac is acting as a series current sensing resistor, the voltage across it has all the phase attributes of the current waveform. The outputs of the inverter 68 and the comparator 70 are applied to the inputs of AND gate 76. The output of gate 76 is a pulse whose duration is equal to the phase difference between the voltage zero crossings and the lagging edge of the current waveform. The output waveform from gate 76 is shown in FIG. 4E.

Variable one-shot 78 is calibrated to provide an output pulse whose duration is equal to the full load phase lag of current to voltage for the particular motor to which the controller is connected. This value varies for each motor and can be initially calibrated for the particular motor. The output of one-shot 78 allows for proper tracking of the remaining circuitry. Such output is shown in FIG. 4F.

One-shot 80 receives the output from one shot 78 and provides a fixed time output pulse which begins on the termination of the pulse from one-shot 78. Typically, the pulse is set at 4 miliseconds. The output from one-shot 80 is shown as the waveform of FIG. 4G.

The pulse from one-shot 80 and the square wave from AND gate 76 are applied to the inputs of AND gate 82 whose output is a pulse whose width varies in accordance with the loading on the motor. In the present situation, it varies from zero at motor full load to some value less than or equal to 16 cycles of oscillator 84 at motor no-load.

With the circuitry thus far described, there will be derived a phase angle pulse once per cycle. In order to achieve a phase angle at twice per line cycle, the additional circuitry shown in dotted line can be included. Specifically, the negative current waveform represented by the voltage across the triac 72 is squared by the comparator 86 and applied to one input of AND gate 88. To the other input of AND gate 88 there is applied the output of the one-shot 82 which is now generating a pulse at twice per cycle. The reason for this is that on one-shot 78, the connection 90 is made to the negative input of one-shot 78 causing it to be triggered by the zero crossing of each half cycle.

The output of AND gate 88 is then a pulse whose duration is equal to the phase lag between the negative line voltage half cycle and the negative current half cycle minus the duration of pulse from one-shot 78 which is set equal to the phase lag of the particular rotor at full load. This output pulse from AND gate 88 is sent to the OR gate 92 where it is combined with the output of AND gate 82 in order to produce phase angle pulses at twice per line cycle. By having pulses at twice per line cycle, there is provided improved response and output waveform symmetry which brings about improved results in the circuit.

The waveform at the output of AND gate 82 is shown as waveform 4H while the output of comparator 86 is shown as waveform 4I and the output from AND gate 88 is shown as the waveform 4J. The final combined output from OR gate 92 is shown as the waveform 4K.

AND gate 94 enables the signals from the oscillator 84 to pass to the clock input of counter 96, which is a 4 bit binary counter. These pulses pass only during intervals during which a pulse appears at the output of AND gate 82 or 92. The waveform at the output of AND gate 94 is shown at 4L.

The four bit binary counter 96 is reset at the beginning of each output pulse from one-shot 80 across line 98. Counter 96 then counts upward in binary code for the time equal to the duration of the output from AND gate 82 or gate 92. If the output of counter 96 should ever reach count 15, AND gate 100 is provided which prevents the counter from counting above count 15 by disabling it at this count.

The output of counter 96 is applied to the input of a digital-to-analog converter 102 which translates the count into a proportional DC voltage shown in FIG. 4M. The output of counter 96 is also applied to a display which can either be a bar-graph or a seven segment type display in order to indicate percentage power savings. The display is shown at 104 and it passes through the decoder 106 prior to the display.

The AC voltage from the converter 102 is applied to the input of gate 108 which switches on alternately with the counter enable pulse from the one-shot 80 taken along line 110. The enable pulse is shown in FIG. 4O.

The output of analog gate 108 is then applied to damping network 112. The function of the damping network is to store the output of the analog gate, serving is a memory during the periods when the analog gate is disabled. This network also serves to smooth out sudden changes in the input level in the direction which reduces voltage to the motor allowing the system to gradually apply less voltage to the motors so as to obtain greater stability. It also enables the controller to have fast response when a sudden load is applied to the motor which creates a sudden decrease in phase lag between voltage and current and therefore a sudden zero pulse width from AND gate 76. This would consequently provide zero voltage output from the digital to analog converter 102 by means of the forward conduction of the two diodes 114, 116 which are connected in parallel across the resistor 118. An additional capacitor 120 is connected across the line.

When the input to the damping network 120 exceeds two diode forward voltage drops with respect to the voltage previously stored on the capacitor 120, this voltage will be instantaneously changed to a value which is equal to the input plus two diode drops, providing a sudden increase in motor voltage to drive the increased load.

Additionally, since the capacitor 120 is discharged when the motor is disconnected from the output of the controller, the system will apply full voltage and therefore start the motor quickly when either the motor is switched on separately at the output of the controller or when the motor and controller are switched on together to the AC power source.

The output of the damping network is shown in FIG. 4N.

One-shot 122 receives the output from the inverter 68 and provides a short pulse, typically 50 microseconds, upon each zero crossing of the AC power source voltage. These pulses synchronize oscillator 140 along line 124. They also synchronize oscillator 126 which provides a clock signal to the binary counter 128 which is a four bit binary counter. The pulses also reset the binary counter 128 at each zero crossing. Counter 128 then counts upwardly in binary code to count 15 as determined by the frequency of oscillator 126 and is then reset at each zero crossing.

The output of counter 128 is applied to the digital to analog converter 130 which translates the count into a proportional DC voltage level. The output of the converter 130 is then a staircase waveform, as shown in FIG. 4Q. This waveform starts at zero voltage and increments in 15 steps to the power supply voltage repeating twice per power line cycle.

The output of the digital to analog converter 4Q comprises a reference signal to which the output of damping network 19 is compared by means of the comparator 132. The output of the comparator 142 is shown as the waveform 4R. This waveform produces a pulse beginning at the instant where the staircase waveform level exceeds the level of the output of damping network 132 and terminates at the AC power zero crossing. The pulses from the comparator 132 is then amplified to amplifier 134 and is applied to the control terminal of the triac 72. The voltage is shown in FIG. 4S as it is applied to the triac.

When the voltage is applied to the triac, it turns on voltage to the motor at some time delayed in the AC power cycle corresponding to a small difference in the phase lag between the voltage and current signals from no load to full load. The voltage across the motor is shown as waveform 4U while the voltage across the triac is shown in waveform 4T.

Typically, the variable one-shot will produce an output of between zero and 4 mS, the fixed one shot 80 will produce a timing signal of 4 mS. The gated oscillator 84 is a 50 KHz clock while the gated oscillator 126 is a 2 KHz clock.

There has been disclosed heretofore the best embodiments of the invention presently contemplated. However, it is to be understood that various changes and modifications may be made thereto without departing from the spirit of the invention.

We claim:

1. A digital power factor controller for an AC induction motor comprising:
   control means adapted to be electrically connected in series with the motor for controlling a voltage applied across the motor;
   sensing means for providing gated clock signals whose count varies in accordance with a difference in phase between a current through the motor and the line voltage across the motor;
   reference means for providing reference clock signals whose count represents a full cycle of the line voltage and wherein the count is reset for each zero crossing of the line voltage;
   comparison means for comparing an output of said sensing means with an output of said reference means and producing a phase lag control signal, said control signal being applied to said control means for controlling a conduction angle of the voltage applied to the motor to thereby provide power to the motor commensurate with the motor loading;
   said sensing means including first circuit means for sensing the line voltage and providing a square wave output in phase therewith, second circuit means coupled to said control means and providing a square wave output in phase with the current therethrough, and gating means for combining said square wave outputs from said first and second circuit means to provide square wave pulses representative of the phase difference between the voltage and current; and a variable trigger circuit responsive to said first circuit means and providing an output whose duration is calibrated to equal a full load phase lag of the motor, a fixed trigger circuit activated by the end of said variable trigger circuit output providing an output of fixed duration, the output of said fixed trigger circuit limiting the operation of said gating means to correct for the full load phase lag.

2. A digital power factor controller as in claim 1, wherein said second circuit means produces its square wave output responsive to positive current waveforms whereby said gating means output pulses are responsive to the phase lag between the positive line voltage half cycle and the positive current half cycle, and further comprising third circuit means coupled to said control means and providing a square wave output in phase with the negative current, and further gating means receiving the output of said third circuit means and said fixed trigger circuit output for providing square wave pulses representative of the phase difference between the negative line voltage half cycle and the negative current half cycle corrected for full load phase lag, and combining means for combining the outputs of said first mentioned gating means and said further gating means to produce phase lag pulses twice per line cycle.

3. A digital power factor controller as in claim 1, and further comprising oscillator means, counter means coupled to said oscillator means and activated by the output of said gating means to count the output of the oscillator means during said square wave pulses to thereby produce said gated clock signals.

* * * * *